Figure 1:
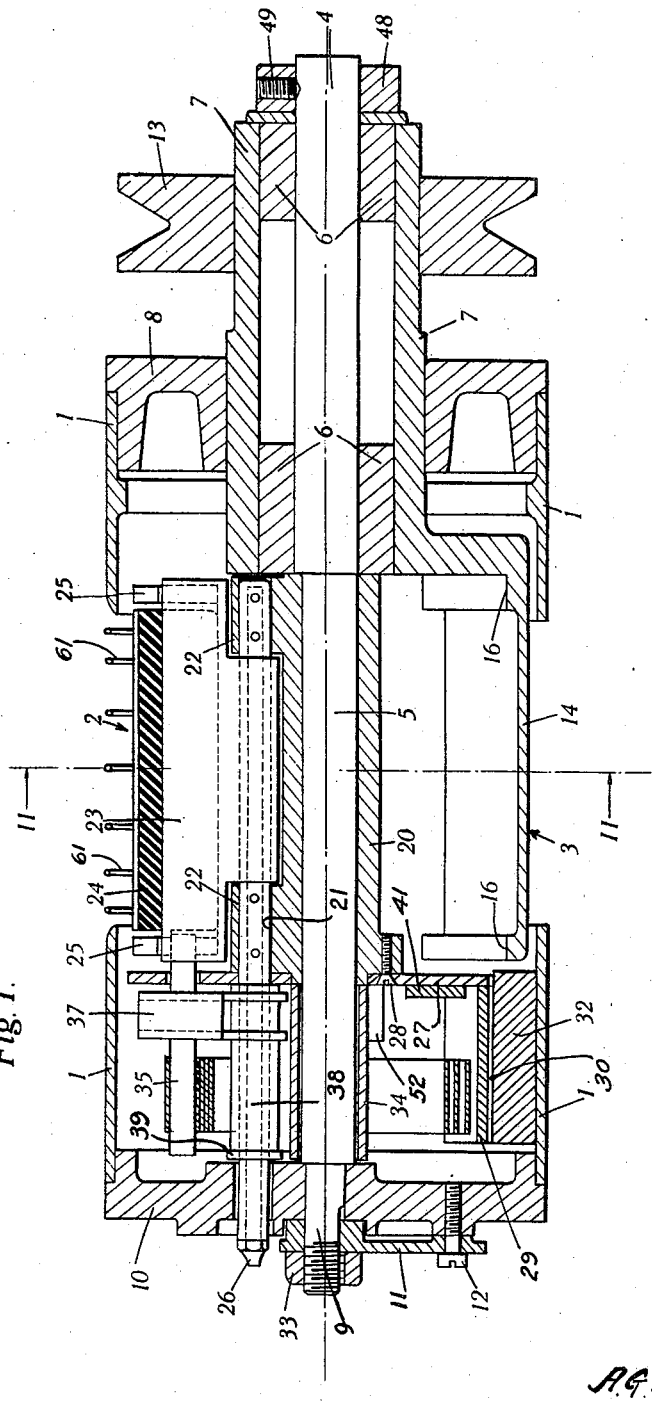

Nov. 5, 1940.  A. G. BUDD ET AL  2,220,811
MEANS FOR CARRYING OUT PLUCKING OPERATIONS
Filed Sept. 29, 1937  3 Sheets-Sheet 1

INVENTORS
A. G. BUDD.
BY H. BARTON
ATTORNEYS

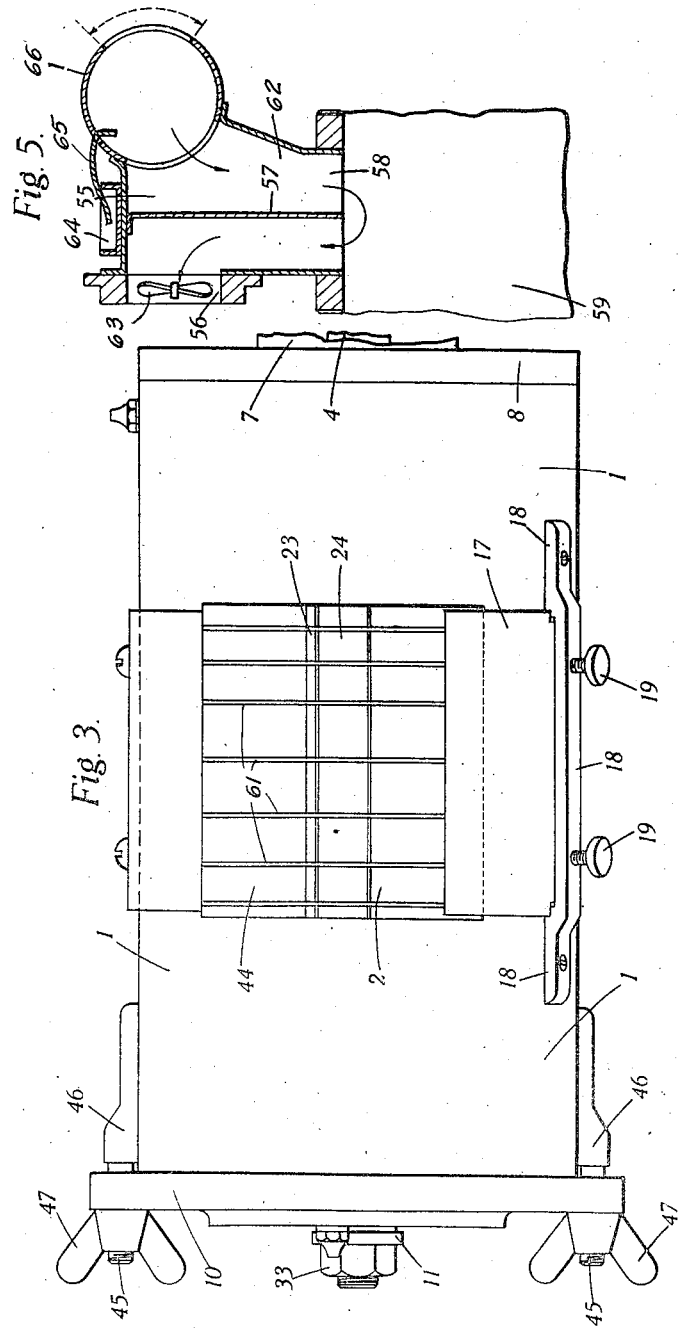

Patented Nov. 5, 1940

2,220,811

UNITED STATES PATENT OFFICE 2,220,811

MEANS FOR CARRYING OUT PLUCKING OPERATIONS

Anthony George Budd and Henry Barton, West Moors, Dorsetshire, England, assignors to Comb Pluckers Limited, Hampshire, England, a British company Application September 29, 1937, Serial No. 166,444
In Great Britain September 30, 1936

15 Claims. (Cl. 17—11)

This invention relates to improvements in or relating to means for carrying out plucking operations.

The improved apparatus which is the subject of the invention can be applied to a variety of purposes where "plucking" is desired but is particularly suitable for removing feathers, stubs, down and the like from birds and one of the objects thereof is to provide simple and efficient means whereby plucking operations may be easily and quickly carried out.

It is well known that the efficient removal of stubs, pin feathers and the like from a bird is attended by great difficulties not only on account of the difficulty in gripping the relatively fine matter, but further on account of the liability of breaking the stubs or pin feathers and so freeing the liquid contained, which liquid in admixture with feathers, down and the like leads to the formation of a mass which clogs the plucking machine so preventing its efficient operation and in many cases leading to damaging of the flesh of the bird under treatment. A further object of the present invention, therefore, is to provide plucking means which will effectively free the flesh of a bird of all stubs, pin feathers and fine material and avoid the above mentioned difficulties thereby ensuring that the flesh of the treated bird will have a thoroughly cleaned and undamaged surface.

It is another object of the present invention to provide means for carrying out plucking operations including two angularly movable members co-operating to form gripper jaws, one of said members comprising a blade movable in a circular path and the other an oscillatory abutment.

In accordance with a still further object of the present invention there is provided means for carrying out plucking operations including two angularly movable members co-operating to form gripper jaws, one of said members comprising a blade adapted to be moved in a circular path and the other comprising an abutment adapted to be moved into and out of the path of said blade.

It is yet another object of the present invention, to provide means for carrying out plucking operations comprising a plucking blade adapted to be moved in a circular path and a complementary abutment adapted to oscillate in a path periodically intersecting or meeting the path of said blade, such abutment being, for instance, caused to oscillate in an arc slightly eccentric with respect to the path of the blade.

The aforesaid components co-operating to form gripper jaws may be mounted in any convenient casing or the like and a plucking aperture of any desired size, or one of the variable size, may be provided adjacent to the zone over which said components co-operate to effect a gripping action.

The aforesaid component serving as an abutment may be caused to oscillate by any convenient means. Thus, for instance, the desired oscillatory movement may be positively effected with the aid of any suitable gearing synchronised with the driving mechanism of the rotary blade although said abutment is preferably caused to move in one direction by direct or indirect engagement with the rotary blade and in the other direction by spring pressure.

The aforesaid rotary blade may, in some cases, be permitted to make direct contact with that part of the surface of the gripper component serving as an abutment which, under operating conditions, bears against the matter to be plucked but, in general, and in particular in cases where stubs, pin feathers or material prone to being easily broken has to be treated, it is desirable to avoid any tendency for the two surfaces to come into sudden contact with each other. In order to achieve this, co-operating slippers, guides, cams or the like of any suitable kind may be fitted to, or be formed integral with, one or both of components co-operating to form the gripper jaws. Thus, for instance, the whole of the initial impact may be absorbed by such slippers, guides, cams or the like and thereafter and as the abutment is caused to move the operative surface of the latter may be permitted to approach the gripping surface of the blade.

Apparatus according to the present invention preferably includes means whereby any tendency for the plucked matter to be crushed whilst it is still located between the gripper jaws is avoided. Thus, for instance, the above mentioned slippers, guides, cams or the like may be so disposed that immediately after the abutment recedes sufficiently to free its grip on the plucked matter they urge said abutment into, and maintain it in, a position spaced from the plucking blade.

Any suitable stops, preferably of a resilient nature, may be provided for limiting the movement of the aforesaid oscillatory abutment and, if desired, such stops may be of an adjustable nature.

The operative surface of one or both of the aforesaid components co-operating to form gripper jaws may be formed from or covered with rubber or other resilient material and any suitable provision may be made for adjusting the degree to which such surfaces can approach each other in order to attain the desired grip on the material to be plucked. Thus, for instance, the oscillatory component may be mounted on a spindle which is movable in the frame of the machine or it may have an eccentric bearing on such spindle so that by turning the latter the position of the abutment may be varied with respect to the rotary blade. In a further embodiment said abutment may be movably mounted with respect to its spindle thus it may be adjustable in a radial direction.

Means are preferably provided for conveying the plucked material through the machine, for example to grading or bagging apparatus; thus, for instance, a fan may be employed for establishing an air current causing such matter to pass through the machine and this would give the additional advantage of inducing the matter to be plucked to enter the plucking aperture.

The aforesaid rotary blade is preferably provided with a rearwardly extending arcuate guard serving to maintain the plucking aperture in a closed condition during a material part of the cycle of operations and the oscillatory member may be provided with a forwardly extending guard serving to cover the whole of said aperture in advance of said member. In this way the possibility of the fingers of an operator being caught in the plucking mechanism is rendered extremely remote.

The aforesaid gripping assembly is preferably mounted within a casing in such a way that it can be drawn therefrom, for example for cleaning purposes without dismantling such assembly.

Figure 2:
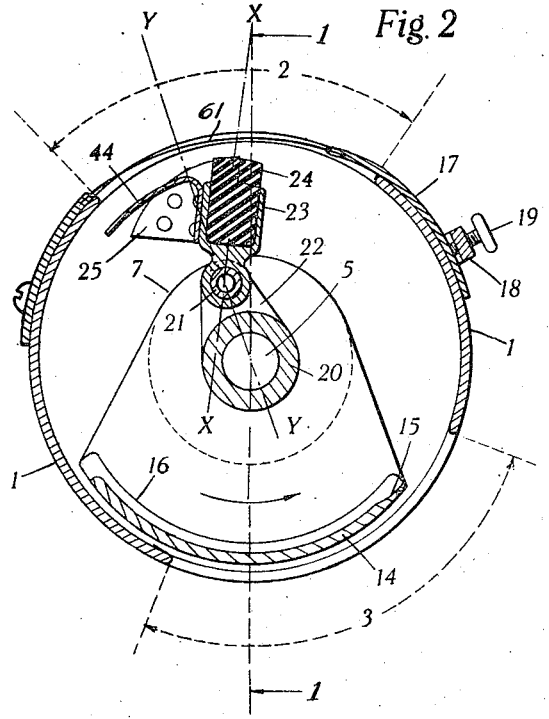
Figure 4:
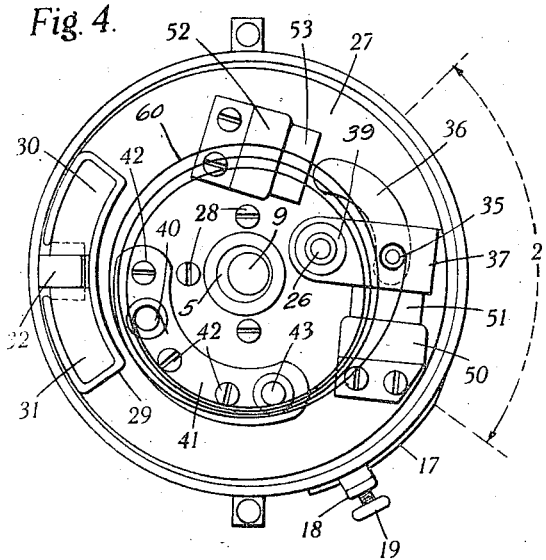

With these and other objects, which will become apparent from the following description, in view, the advantages of the invention will be more fully set out and the various novel features described and claimed, a preferred construction whereby these objects may be attained being illustrated in the accompanying drawings in which:

Figure 1 is a sectional plan view of the apparatus, certain parts being omitted for the sake of clearness, Figure 2 is a sectional view on the line II—II of Figure 1, Figure 3 is a front elevation with part of the driving mechanism broken away, Figure 4 is an end view of Figure 3 with the end cover removed and Figure 5 shows in sectional view an attachment for the discharge conduit leading from the machine.

In this example the plucking machine comprises a cylindrical casing 1 having an inlet opening 2, a discharge opening 3 and a main spindle 4 passing axially therethrough.

The aforesaid spindle 4 includes a medial portion 5 turned slightly eccentrically with respect to the ends of the spindle for a purpose hereinafter described.

The right hand end of the spindle 4 (as seen in Figure 1) forms a bearing, for example through the medium of the collars or races 6, 6, for a sleeve 7 which sleeve also has a bearing in the end plate 8 of the casing 1, the other end 9 of said spindle 4 being of reduced diameter and passing through an end plate 10 fitted to the other end of the casing 1. Said end 9 of the spindle includes a flattened portion cooperating with a lever 11 having a D-shaped aperture, said lever being provided for maintaining the spindle 4 in any desired angular position and making provision whereby this position may be varied for a purpose hereinafter described. This lever may for instance be secured in a desired position by means of the screw 12 making selective engagement with a series of holes in the plate 10 or passing through an arcuate slot in the lever 11.

A pulley 13 is fitted to the sleeve 7 and a plucking blade 14 is fitted to or formed integrally with the inner part of said sleeve, such blade being of arcuate form and radiused to the centre about which it turns. The inner surface of the leading edge 15 of said blade may be serrated or roughened and if desired such surface may be hollow ground or bevelled. The parts 16, 16, of said blade extending from each end of the leading edge 15 are developed in the form of guides or path cams serving a purpose hereinafter described.

The aforesaid blade 14 may be of any desired length dependent upon the maximum amount of material which it may be desired to grip in a single gripping action and registers with the aforesaid plucking aperture 2 which aperture may be provided with any desired adjustable plates for the purpose of varying the size and/or shape of said aperture. In the drawings for instance the lower boundary of the aperture is defined by the edge of a plate 17 passing under a bridge 18 and locked in any desired position by means of set screws 19.

A carrier 20 is fitted around the eccentric part 5 of the spindle 4, said carrier being prevented from sliding towards the right in Figure 1 by the shoulder formed at the junction of the part 5 of the spindle and the end portion thereof.

A bearing pin 21 extends through lugs 22, 22, projecting from the carrier 20 and forms a hinge pin for the member 23 hereinafter referred to as an abutment.

Said abutment 23 includes a channel extending in a direction parallel to the axis of the machine and a resilient block 24, for instance of rubber, is located in said channel. The abutment 23 is also provided with two side plates 25, 25, serving as shoes adapted to co-operate with the aforesaid guides or path cams 16, 16 formed on the blade 14, the relationship between said parts 25, 25 and 16, 16, being such that as the blade 14 is rotated the front edges of the path cams 16, 16 strike the shoes 25, 25 thereby turning the abutment member 23 and further movement of said blade brings the gripping edge thereof into contact with the block 24 after which continued movement of the blade 14 causes the gripping surfaces to recede from each other until such time as engagement between the cams 16 and shoes 25 is terminated whereupon the abutment 23 is caused to return to its initial position in a manner hereinafter described.

The desired movement of the resilient block 24 towards and away from the path of the blade 14 is obtained in the machine now being described by so mounting said member 23 that in its initial position it is on one side of a position of dead centre and in its final position it is on the other side thereof, coupled with the fact that movement of said member is attained by co-operation between said shoes 25 and path cams 16. The dotted line X—X indicates the centre line of the abutment in its initial position and the dotted line Y—Y indicates the centre line when the centre about which the abutment turns, the axis about which the blade 14 turns and the mid-point of the abutment are in alignment, it being readily appreciated that in the latter position the resilient block 24 is in the limit position of its movement towards the path of the blade 14.

The hinge pin 21 extends through the end plate 10 of the casing and is preferably hollow and provided with a grease nipple 26 to permit of grease being supplied to the bearings therefor.

A bearer plate 27 is threaded over the main spindle of the machine and secured to the carrier 20 by screws 28, said plate extending across the casing of the machine so as to prevent any plucked matter from passing into the left hand compartment as viewed in Figure 1 of the drawings.

In order to offer resilient opposition to any turning movement of said plate 27 with respect to the casing 1 a box 29 (shown in Fig. 4) is secured to said plate and provided with two rubber blocks 30, 31 adapted to make engagement with the respective sides of a key 32 secured to the inside of the casing 1.

The spindle 4 of the machine is secured to the end plate 10 by means of a nut 33 serving to draw said plate tightly against the shoulder formed between the parts 9 and 5 of the shaft and if desired being locked in position in any suitable manner. If desired a spacing sleeve 34 may be loosely mounted around the part of the main spindle extending between the plates 27 and 10.

A pin 35 extends from the oscillatory abutment 23 through an arcuate slot 36 in the bearer plate 27 and is supported in an arm 37 having a bearing on the aforesaid hinge pin 21. Said arm 37 is located in the desired position by means of a sleeve 38 which sleeve also serves, in conjunction with the collar 39, to prevent endwise movement of the hinge pin 21.

A coil spring 60 is provided for resiliently urging the abutment member in a clockwise direction as viewed in Figure 4 (i. e. in a direction opposite to that in which it is positively moved by the blade 14) said spring being anchored at one end to the pin 35 and at the other end to a pin 40. Said pin 40 projects from a bearer plate 41 which is secured, for instance by means of screws 42, to the carrier plate 27. Said bearer plate 41 is provided with a second pin 43 forming a guide for the spring 60. The aforesaid spring and mountings therefor are clearly shown in Figure 4 but for the sake of clarity they have been omitted from Figure 1.

In order to cover the plucking aperture 2 as much as possible when the abutment member 23 is in the position shown in Figure 2 a forwardly extending guard 44 is fitted to said member and if desired a wire grid 61 or the like may extend over the whole of the plucking aperture as a further precaution against a user having his fingers trapped.

In order to secure the end plate 10 to the casing 1 studs 45 extending from lugs 46 on said casing are provided, said lugs being adapted to pass through apertures in said plate 10 and to be engaged by butterfly nuts 47. The remote end of the spindle 4 is provided with a thrust collar 48 secured for instance by means of a set screw 49 thus completing the secure assembly of the machine.

It is in some cases desirable to provide stops, preferably of a resilient and/or adjustable nature, for defining the limit positions of the above mentioned oscillatory member 23. In the present embodiment of our invention a return stop 50, provided with a rubber facing 51, and an over-run stop 52 also provided with a rubber facing 53, are fitted to the plate 27 and extend into the path of said member 23.

It will be readily appreciated that by turning the main spindle 4 of the machine (such adjustment being effected in the present embodiment of our invention by means of the lever 11) the hinge pin 21 for the oscillatory abutment 23 may be swung towards or away from the path of the rotary blade 14 owing to the bearings for such pin being mounted on the eccentric part 5 of the spindle 4. In this way the extent to which the gripping surfaces of the blade 14 and member 24 approach one another may be adjusted to suit any particular requirements and to take up any wear which may result from long periods of use.

The aforesaid outlet aperture 3 of the machine may be connected to any desired discharge chute 62 and a suction fan 63 or the like is preferably provided for drawing any plucked matter through the machine and for inducing the matter to be plucked to enter the plucking aperture 2.

The discharge conduit may advantageously include a trap for stubs and the like so that only feathers and down are conveyed to the bagging or collecting apparatus. A suitable form of trap is illustrated in Figure 5 of the accompanying drawings and comprises a chamber 55 secured to the casing 1 of the plucking machine and provided with an outlet or delivery opening 56, the chamber 55 being provided with a vertical baffle 57 below which is provided a second outlet 58 around which can be fitted a stub-collecting bag 59.

When the above trap is in operation any feathers, down and like light material will readily follow the circuitous course indicated by the arrows in Figure 5 whereas any stubs, pin feathers or other relatively dense matter will leave the air stream when this changes from a downward to an upward direction and will continue downwardly into the bag 59. Said bag 59 is of a non-porous nature so as to avoid the possibility of there being any air current into and through the bag which current would, of course, entrain the light material.

It will be apparent from the foregoing description that at one point in a cycle of operations the oscillatory abutment 23, 24 as well as the rotary blade 14 will move into positions wholly exposing the plucking aperture 2, offering a sufficiently free air inlet for the desired air current being established.

The operation of the above described plucking machine is as follows:

A bird is held against the plucking aperture 2 so that the material to be plucked is positioned in the shallow slot between the lower guard 17 and the oscillatory gripping element 24 of the machine. The rotary blade 14 then approaches said element and the path cams 16, 16 and shoes 25, 25 co-operate to cause the oscillatory element 24 to move with the blade 14 but very early in such movement the co-operating gripper surfaces are brought together so gripping the matter to be plucked and plucking is effected by continued movement of said parts. As soon as the gripper has moved a short distance with the operative surfaces tightly urged together the grip on the plucked matter is released and thereupon the gripping elements are separated by the co-operating path cams 16, 16 and shoes 25, 25 so as to avoid any crushing or rubbing of the material and wiping thereof round the the inside of the blade and the rotary blade 14 continues its movement until the rearwardly extending part thereof, which up to this stage in the sequence of operations has kept the plucking aperture entirely closed, first of all completely uncovers such aperture, so permitting new material readily to enter and then frees the oscillatory element 23 which returns to its initial position under the action of the aforesaid spring 39 so retaining a line of stubs or the like in the narrow slot between said element and the lower guard 17 and the blade returns for the next cycle of operations. The above mentioned return movement of the oscillatory element 23 and its guard 44 effects a smoothing action on the skin of the bird and ensures that any flesh which might have been drawn forwardly during the prior plucking operation is restored to a proper position before the following plucking operation ensues. This particular operation of the plucking action is a very valuable one from the point of view of avoiding any damage of the flesh of the bird and permitting of the flesh of the bird being brought very close to the rotary blade, even to a position of actual contact therewith and ensuring a very thorough cleaning operation.

Whilst we have hereinbefore described one example of a machine according to the present invention we wish it to be understood that the particular details may be varied or modified without departing from the scope of such invention. Thus, for instance, the machine may be made of any desired capacity and any suitable means may be provided, if desired, for cleaning the blade or blades of the machine, thus, for instance, in the above described embodiment a water tray 64 may be provided on the machine and a wick 65 may lead from such tray through a slot 66 into the path of the rotary blade so that the outer surface of said blade is automatically wiped during each revolution.

We claim:

1. A plucking machine comprising in combination a spindle, a blade member movable in a circular path thereabout, a bearing carried on an eccentric part of said spindle, an oscillatory abutment co-operating with said blade member to form gripping jaws, said abutment being carried by said bearing, and means for rotating said spindle whereby to vary the degree of approach of said blade member and said abutment.

2. A plucking machine comprising in combination a blade member movable in a circular path, an oscillatory abutment co-operating with said member to form gripping jaws, said abutment being movable in an angular path, at least one shoe member carried by said abutment, at least one path cam carried by said blade member, and means for rotating said blade member, said path cam and shoe member contacting with one another to cause an initially tight grip between said abutment and said blade member, said abutment being subsequently turned about its axis so as to recede from said blade member.

3. A plucking machine comprising a casing having plucking and discharge apertures, a spindle, a blade member movable in a circular path thereabout, a bearing carrying an angularly movable abutment co-operating with said blade member to form gripping jaws, said bearing being eccentrically mounted with respect to said spindle, means for securing said spindle in a predetermined position of angular adjustment corresponding to the desired degree of approach of said blade member and said abutment, at least one shoe member carried by said abutment, at least one path cam carried by said blade member and co-operating with said shoe member whereby to influence the gripping action, guard members carried by said blade member and said abutment, and spring means whereby to return said abutment after the plucking stroke, said guard member carried by said abutment serving during the return stroke to exert a smoothing action on the plucked flesh.

4. A plucking machine comprising in combination a blade member movable in a circular path, an abutment movable angularly about an axis parallel to the axis of said path, means normally constraining said abutment away from said closed path, and co-operating means carried by said blade member and said abutment respectively whereby during a part of the movement of said blade member in said path, said abutment is rocked about its said axis in opposition to said constraining means whereby it moves into and out of gripping relationship with said blade member.

5. A plucking machine comprising in combination a blade member movable in a closed path, a movable abutment, co-operating means carried by said blade member and said abutment respectively for periodically moving said abutment towards and away from said blade member while moving said abutment with said blade member, and means for varying the degree of approach of said abutment to said blade member.

6. A plucking machine comprising a casing having an aperture, an adjustable guard for said aperture, an abutment mounted within said casing, a blade member mounted within said casing for movement in a closed path whereby to sweep periodically past said aperture between the latter and said abutment, and means for moving said abutment into and out of gripping relationship with said blade member during passage of said blade member past said aperture.

7. A plucking machine comprising in combination a casing having an aperture, a wire grid guarding said aperture, an abutment mounted within said casing, a blade member mounted within said casing for movement in a closed path whereby to sweep periodically past said aperture between the latter and said abutment, and means for moving said abutment into and out of gripping relationship with said blade member during passage of the latter past said abutment.

8. A plucking machine comprising in combination a blade member movable in a closed path, the inner surface of the leading edge of said member being hollow-ground, an abutment and co-operating cam means on said blade member and said abutment whereby during a part of the movement of said blade member in said closed path, said abutment is carried along with and moved into and out of gripping relationship with said blade member.

9. A plucking machine comprising in combination a blade member movable in a closed path, the inner surface of the leading edge of said blade member being roughened, an abutment, and co-operating cam and shoe means on said blade member and said abutment respectively whereby during a part of the movement of said blade member said abutment is carried along with and moved into and out of gripping relationship with said blade member.

10. A plucking machine comprising in combination a casing having an aperture, a blade member mounted within said casing for movement in a closed path past said aperture, an oscillatory abutment co-operating with said blade member to form gripping jaws, said oscillatory abutment being movable from a rest position at one side of said aperture to a position at the other side of said aperture, and a forwardly extending guard member carried by said abutment and serving to cover that part of the aperture which extends forwardly of said abutment when the latter is in said rest position.

11. A plucking machine comprising in combination a blade member movable in a closed path, an oscillatory abutment co-operating with said member to form gripping jaws, said abutment being movable in an angular path, at least one shoe member carried by said abutment, at least one path cam carried by said blade member, a spring member attached to said abutment, said spring constraining said abutment to one limit position of said angular path, and said path cam contacting with said shoe during movement of said blade member so as to bring said abutment and said blade member into gripping relationship.

12. A plucking machine comprising in combination a blade member movable in a circular path, an oscillatory abutment, means on said blade member and on said abutment for moving said abutment with said blade member and bringing said abutment during its movement with the blade member into and out of gripping relationship with said blade member, and at least one positive stop limiting the movement of said abutment.

13. A plucking machine comprising in combination a blade member movable in a closed circular path, an abutment movable in an angular path into and out of said closed path, and means on said blade member for periodically moving said abutment in said angular path and into and out of gripping relationship with said blade member, the surface of said abutment contacting with said blade member being of resilient material.

14. A plucking machine comprising in combination a casing, a plucking aperture in said casing, a blade member mounted in said casing for movement in a closed path past said aperture, an abutment movable in an angular path into and out of gripping relationship with said blade member and having a rest position at one side of said aperture, a forwardly extending guard member carried by said abutment serving to cover that part of the plucking aperture which extends forwardly of said abutment in said rest position, and means for returning said abutment member to said rest position after a plucking stroke, said guard serving to exert a smoothing action on the plucked flesh during the return movement of said abutment to said rest position.

15. A plucking machine comprising, in combination, a blade member movable about a first centre in a circular path, an abutment movable in an angular path within said circular path about a second centre disposed within said circular path, said abutment being movable from a limit position on one side of a line joining said two centres to a position on the other side of said line, and means for yieldingly constraining said abutment to said limit position, said abutment being movable by said blade member from said limit position to a position on the side of said line remote from said limit position.

ANTHONY GEORGE BUDD.
HENRY BARTON.